United States Patent

Katsuta et al.

[11] 3,908,468
[45] Sept. 30, 1975

[54] STORAGE TANK LEAK DETECTOR

[75] Inventors: Kihei Katsuta, Nagasaki; Chiaki Matsuyama, Tokyo, both of Japan

[73] Assignee: Mitsubishi Jukogyo Kabushiki Kaisha, Japan

[22] Filed: Mar. 11, 1974

[21] Appl. No.: 450,238

[30] Foreign Application Priority Data

Mar. 17, 1973  Japan................................ 48-31188

[52] U.S. Cl.................................. 73/49.2; 73/492
[51] Int. Cl.[2]............................................... G01M 3/16
[58] Field of Search.......... 73/49.2, 40.5 R, 40, 49.1; 340/242

[56] References Cited
UNITED STATES PATENTS 3,489,311   1/1970   Folkerts et al................... 73/49.2 X
3,721,898   3/1973   Dragoumis et al............... 73/49.1 X

*Primary Examiner*—Jerry W. Myracle
*Attorney, Agent, or Firm*—Toren, McGeady and Stanger

[57] ABSTRACT

A storage tank for a low-temperature liquid comprising a tank shell, a heat insulation layer with which the tank shell is lined, a liquid-impervious layer sandwiching the heat insulation layer between itself and the tank shell and serving as a first barrier, a second barrier provided inside the heat insulation layer, and a lamination extended along the inner side of the second barrier and including a capacitor layer which in turn consists of at least two electrically conductive layers and an electrical insulation layer interposed therebetween, said electrically conductive layer provided inwardly of the electrical insulation layer being formed with a multiplicity of fluid passages, so that any leakage of the low-temperature liquid through the lining is detected from a change in the capacity meter reading of the capacitor layer with the penetration of the leaking liquid into the electrical insulation layer by way of the fluid passages.

5 Claims, 7 Drawing Figures

U.S. Patent   Sept. 30,1975   3,908,468

STORAGE TANK LEAK DETECTOR

This invention relates to a tank for storing low-temperature liquids, such as liquefied natural gas, and more specifically to a low-temperature-liquid storage tank equipped with means for detecting any leakage of the liquid through the tank lining.

With a tank lined with a heat insulation layer and further with a liquid-impervious layer for the storage of such a low-temperature liquid, any leakage of the liquid due to a break of the impervious layer can cause sharp cooling, and even rupture from low-temperature embrittlement, of the tank shell portion close to the point of leakage.

The present invention has for its object to provide a low-temperature-liquid storage tank equipped with means for positively and promptly detecting any such leakage arising from the damage of the liquid-impervious layer, whereby the possibility of rupture of the tank shell due to the leakage is eliminated.

To achieve the purpose the low-temperature-liquid storage tank according to the present invention is characterized in that a liquid impervious layer forms a first barrier sandwiching a heat insulation layer between itself and the inner surface of the tank shell, a second barrier against the fluid is extended throughout the heat insulation layer, a lamination is extended along the inner side of the second barrier, said lamination including a capacitor layer which consists of at least two electrically conductive layers sandwiching an electrical insulation layer therebetween, said capacitor layer being connected to capacity meters outside of the tank, and a plurality of fluid passages are provided in the electrically conductive layer inwardly of the electrical insulation layer, so that any leakage of the low-temperature liquid through the passages into the electrical insulation layer can be discovered from a change in the capacity of the capacitor layer.

Another feature of the invention is that the electrical insulation layer is made of gas-permeable material and provides spaces in communication with gas analyzers for the detection of gas leakage.

Still another feature of the invention is that the electrical insulation layer may be made, alternatively, of a honeycomb treated with a mold releasing agent, such as silicone resin, and foam plastics filling the individual cells of the honeycomb. In this case, a gas analyzer may be installed in each circulatory system of an inert gas which is circulated through the spaces formed in the leakagedetective layer, or between the honeycomb and the foam plastics which, in the individual cells of the honeycomb, has contracted upon cooling by the low-temperature liquid in the tank.

A further feature of the invention is that the capacitor layer is made of a plurality of framed panels, the frames being provided with ducts for intercommunication among the gas-permeable electrical insulation layers of those panels.

In the low-temperature-liquid storage tank with the foregoing features of the invention, any leakage of the low-temperature liquid which may arise from a break of the innermost liquid-impervious layer will be temporarily checked by the second barrier and lamination in the heat insulation layer. At the same time, the point of leakage will be quickly located from a capacity meter reading, because the leaking liquid penetrates into the electrical insulation layer through the holes of electrically conductive layer on the inner side of the capacitor layer in the lamination and thereby causes a change in the capacity of the capacitor layer.

Generally, in a tank of this character which stores a low-temperature liquid, the space above the liquid surface contains its vapor. A break in the innermost liquid-impervious layer of the lining will, therefore, cause the leakage of the vapor alone if the defective point is above the liquid level. Even below the liquid level, a minor break may enable the leaking liquid to evaporate so that the resulting gas remains in the gas-permeable electrical insulation layer.

With the leakage detecting system of the present invention, the leaking vapor as described above reaches the gas-permeable electrical insulation layer, and the leakage is readily detected by means of a gas analyzer. Should the low-temperature liquid begin leaking through a break in the innermost liquid-impervious layer of the lining, the leakage will be temporarily checked by the second barrier extended throughout the heat insulation layer. Concurrently with this, the gas produced by evaporation of the leaking liquid mixes in an inert gas, such as of nitrogen, being cycled through spaces in the electrical insulation layer extended along the inner side of the second barrier. The foreign gas is identified by the gas analyzer, and the leakage is instantly detected.

Where the electrical insulation layer is in the form of a honeycomb, the structure is coated with a mold releasing agent. This enables the foam plastics filling the individual cells of the structure to shrink smoothly without crackling upon cooling through the agency of the low temperature liquid stored in the tank, leaving the spaces along the individual cell walls. The honeycomb has an additional advantage of reinforcing the heat insulation layer.

Once a leaking point has been located in the manner described, it will be possible to take some countermeasure, such as lowering the liquid level temporarily below the defective point, to avoid the rupture due to low-temperature embrittlement of the tank shell.

Thus, according to this invention, a lamination having electrical detecting means including a capacitor layer is incorporated in the tank lining, on the inner side of the second barrier. In addition, either a gas-permeable electrical insulation layer of the capacitor layer is communicated with gas analyzers or a capacitor layer having an electrical insulation layer consisting of a honeycomb treated with a mold releasing agent and packed with foam plastics is provided inwardly of the second barrier, with spaces formed by the shrinkage due to low temperature of the electrical insulation layer providing a circulatory system through which an inert gas passes via each gas analyzer. Whether the leaking fluid is liquid or gas, the afore-described arrangement will permit very simple and exact detection of the leakage. An extra advantage of improved reliability of the heat-insulation lining is derived from the adoption of the honeycomb-incorporating capacitor layer which physically strengthens the insulation sub-layer on the inner side of the second barrier.

The above and other objects, advantages, and features of the invention will become apparent from the following description taken in conjunction with the accompanying drawings showing embodiments thereof. In the drawings.

Figure 1:
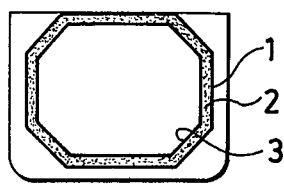
FIGS. 1 and 2 are diagrammatic sectional views of low-temperature-liquid storage tanks embodying the invention.
Figure 2:
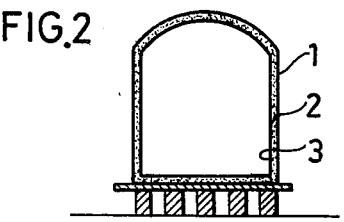

Referring to FIGS. 1 and 2, tanks are shown as installed on a ship and on the ground, respectively. In either case, the tank shell 1 of steel is lined with a heat insulation layer of foam plastics or the like and then with a liquid-impervious layer 3 of low temperature material. The layer 3 is made, for example, of fiberglass reinforced plastics (FRP) sheets of polyurethane, or epoxy sheets.

Figure 3:
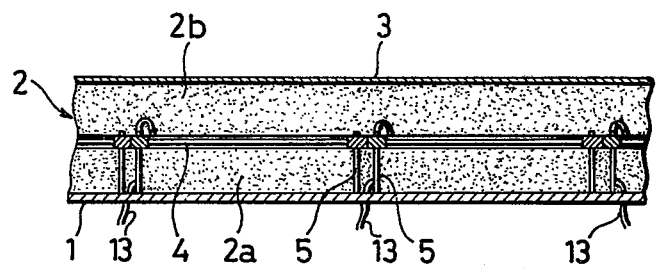
FIG. 3 is a detail, in section, of the lining of either tank shown above.

FIG. 3 shows a detail, in section, of the lining structure. The heat insulation layer 2, sandwiched between the tank shell 1 and liquid-impervious layer 3, consists of two sub-layers; the first heat insulation layer portion 2a on the ordinary temperature side and the second portion 2b on the low temperature side. Between these portions 2a, 2b is extended a second barrier 11 lined with a lamination 4. The second barrier 11 with the lamination is secured parallelly to the inner surface of the tank shell 1 by hollow bolts 5 at given intervals.

Figure 4:
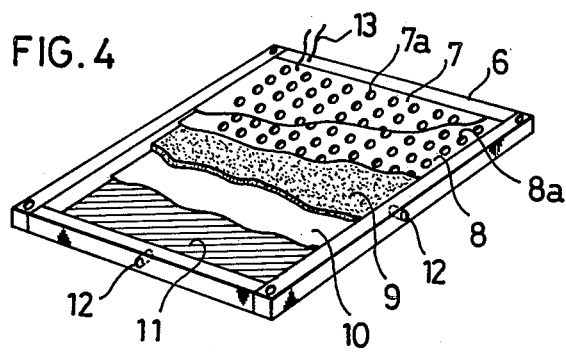
FIG. 4 is a perspective view of one of many panels constituting a lamination inwardly of a second barrier in the tank lining, partly broken away to show interior construction.

FIG. 4 shows, perspectively and in detail, one of many panels to be joined end to end and form the lamination 4. The panel, partly broken away to show the interior construction, is made up of a panel frame 6a and a plurality of component sheets, i.e., a perforated sheet 7 formed with many holes 7a, a perforated aluminum foil 8 having many holes 8a and which serves as an electrically conductive layer, a gas-permeable, electrical insulation layer 9, an aluminum foil 10 as another electrically conductive layer, and a second barrier 11 of impervious synthetic resin, superposed in the order mentioned and framed altogether.

The material for forming the gas-permeable, electrical insulation layer may be foamed plastics of open cell structure, for example. The electrical insulation layer 9, and the sandwiching layers on the both sides, i.e., the perforated aluminum foil 8 and nonperforated aluminum foil 10, combinedly form a capacitor layer.

In connecting the panels to form the continuous lamination 4, each panel is arranged so that the perforated sheet 7 and perforated aluminum foil 8 having many holes 7a and 8a, respectively, face inwardly of the tank, and the resulting lamination is bolted in a spaced relation to the inner surface of the tank shell 1.

The component panels are formed with holes 12 through their panel frames 6 so that communication is established among the spaces in their electrical insulation layers 9.

The panel frame 6, perforated sheet 7, and second barrier 11 may be made of any material impervious to liquids, electrically insulatable, and resistant to low temperatures. The material used in the embodiments shown is polytetrafluoroethylene (PTFE).

Leads 13 for the measurement of the capacity of the capacitor layer are liquidtightly led out of the tank via the hollow bolts 5 shown in FIG. 3, and are connected to capacity meters not shown.

Figure 5:
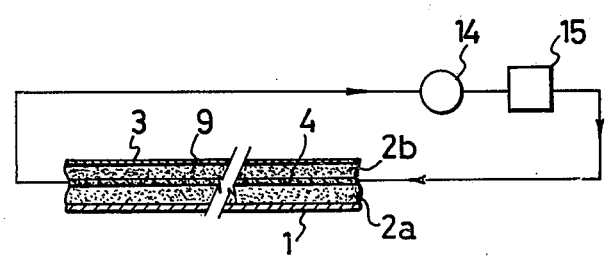
FIG. 5 is a schematic block diagram of a circulatory system whereby nitrogen gas is circulated through a gaspermeable, electrical insulation layer in the lamination in communication with a gas analyzer.

As shown in FIG. 5, nitrogen gas is circulated through the electrical insulation layer 9 by a fan 14, and this circulatory system includes a gas analyzer 15, which may be of a conventional type.

Figure 6:
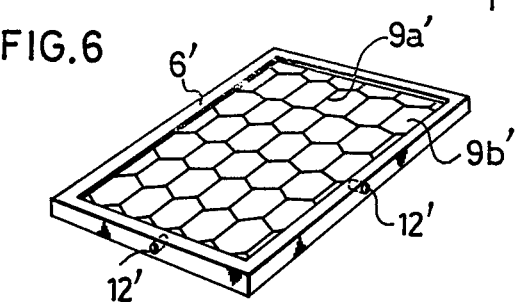
FIG. 6 is a perspective view of one of many panels constituting another form of electrical insulation layer in the tank lining, partly broken away for illustration.

FIG. 6 illustrates another form of the electrical insulation layer, consisting of a honeycomb 9a' treated with a mold releasing agent, and foam plastics 9b' filling the individual cells of the structure. The honeycomb 9a' is made of a highly gas-permeable material, for example, permeable paper. The panel frame 6' is provided with ducts 12' for circulating the nitrogen gas. A plurality of such frames 6' are connected end to end so that their ducts 12' are aligned, and adjoining panels are bonded together with adhesive. In the manner described, an electrical insulation layer 9 similar to the one shown in FIG. 4 is made.

Figure 7:
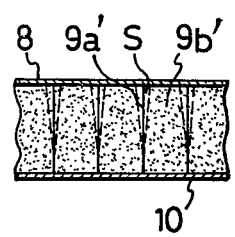
FIG. 7 is a fragmentary sectional view of the electrical insulation layer in the state of low-temperature shrinkage.

FIG. 7 shows that the foam plastics 9b' filled in the honeycomb 9a' during the fabrication at ordinary temperature has contracted on account of the low temperatures produced while the tank is in use, the individual foams shrinking slightly away from the surrounding cell walls of the honeycomb, leaving spaces s behind. These spaces s permit the nitrogen gas to circulate through the panels. A capacitor layer in the form of such an electrical insulation layer composed of the honeycomb 9a' and foam plastics 9b' may be interposed between the liquid-impervious layer 3 and the heat insulation layer 2 to serve as a substitute for the first heat-insulation layer portion 2a shown in FIG. 3.

With the construction described above, the leakage detecting system for the low-temperature-liquid storage tank according to the present invention works as follows. If the innermost liquid-impervious layer 3 of the lining is broken, the low-temperature liquid, such as liquefied natural gas, or its vapor in the tank will gain entrance into the second heat-insulation layer portion 2b, but further ingress will be temporarily checked by the lamination and second barrier 11. To be more exact, the leaking fluid will enter the electrical insulation layer 9 through the holes 7a of the perforated sheet 7 and the holes 8a of the perforated aluminum foil 8 of the lamination but will be kept from further penetration by the aluminum foil 10 and second barrier 11. The ingress of a liquid into the electrical insulation layer 9 by way of a broken point will cause a change in the electrostatic capacity of the capacitor layer consisting of the layers 8, 9, 10, and correspondingly the pointer of the associated capacity meter (not shown) will swing to indicate the leakage exactly.

If any part of the lining facing the gas space inside the tank ruptures and causes leakage of the vapor of liquefied natural gas, or if a minor damage of the lining portion in contact with the liquid leads to evaporation and leakage of the vapor, the resulting methane gas will flow into the nitrogen gas being circulated through the electrical insulation layer. The intrusion of methane gas will be promptly detected by the gas analyzer 15 as a telltale of the leakage.

In the case of an electrical insulation layer consisting of the framed panels as shown in FIG. 6, the leaking gas will mix in the nitrogen gas circulating through the spaces s in the layer 9, thus enabling the gas analyzer 15 to indicate the broken point of the tank.

After the leaking point of the tank has been located by the gas analyzer in the manner described, some remedial step may be taken to prevent the breakdown due to low-temperature brittleness of the tank shell 1, for example by temporarily lowering the liquid level in the tank below the defective point.

We claim:

1. A storage tank for a low-temperature liquid comprising a tank shell, a heat insulation layer with which the tank shell is lined, a liquid-impervious layer sandwiching the heat insulation layer between itself and the tank shell and serving as a first barrier, a second barrier provided inside the heat insulation layer, and a lamination extended along the inner side of the second barrier and including a capacitor layer which in turn consists of at least two electrically conductive layers and an electrical insulation layer interposed therebetween, said electrically conductive layer provided inwardly of the electrical insulation layer being formed with a multiplicity of fluid passages, so that any leakage of the low-temperature liquid through the lining is detected from a change in the capacity meter reading of the capacitor layer with the penetration of the leaking liquid into the electrical insulation layer by way of the fluid passages.

2. A low-temperature-liquid storage tank as defined in claim 1 including a gas analyzer and wherein the electrical insulation layer is made of gas-permeable material which provides spaces in communication with said gas analyzer for detecting gas leakage.

3. A low-temperature-liquid storage tank as defined in claim 1 wherein the electrical insulation layer is made of a honeycomb treated with a mold releasing agent and packed with foam plastics.

4. A low-temperature-liquid storage tank as defined in claim 3 wherein the electrical insulation layer upon shrinkage with low temperature forms sufficient spaces between the honeycomb and the foam plastics filling its individual cells for circulation of an inert gas in circulatory systems, and a gas analyzer connected to each of the circulatory systems.

5. A low-temperature-liquid storage tank as defined in claim 1 wherein the capacitor layer is in the form of framed panels and each frame is provided with a plurality of ducts for establishing communication among the gas-permeable electrical insulation layers of the panels and thereby constituting a continuous insulation layer throughout the lining.

* * * * *